Figure 1:
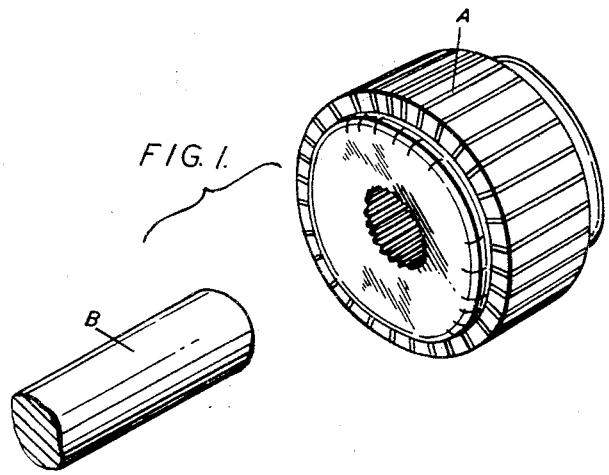

May 10, 1955

H. G. DUNN 2,708,246

SECURING OF SHAFTS IN SYNTHETIC RESIN
MOULDINGS FOR A COMMUTATOR

Filed Sept. 8, 1949

Inventor
Harold George Dunn
By
Harry S. Duwars
Attorney

2,708,246

SECURING OF SHAFTS IN SYNTHETIC RESIN MOULDINGS FOR A COMMUTATOR

Harold George Dunn, Perivale, Greenford, England, assignor to The Hoover Company, North Canton, Ohio, a corporation of Ohio Application September 8, 1949, Serial No. 114,524

Claims priority, application Great Britain September 21, 1948

5 Claims. (Cl. 310—235)

This invention relates to means for securing a rod or shaft in a hole in a synthetic resin moulding.

According to the present invention a method of securing a rod in a hole in a synthetic resin moulding includes moulding the hole with ribs or splines so that the inner diameter of the hole is slightly less than the diameter of the rod, whilst the outer diameter is slightly greater, and thereafter forcing the pin into the hole.

The ribs or splines may be arranged in any way consistent with removal of the moulding from the mould, for example they may take the form of a helix or screw-thread. Preferably however, to facilitate removal from the mould they extend approximately longitudinally, for example parallel to the axis or along helices of very long pitch.

The invention also includes a moulding of synthetic resin having a rod secured in a hole in it by the method referred to.

The invention may be applied to a great variety of mouldings for securing to them a variety of rods, whether intended to rotate or not, but one particular application for which it has been found particularly useful is for securing the commutators of small electric motors to their shafts. In this application it has hitherto been the practice to provide a metallic bush round which the commutator is moulded and which is an interference fit on the shaft which has to be precision ground to close limits.

One object of the present invention is to provide a satisfactory arrangement which eliminates the central bush. This, however, presents certain difficulties due to the unequal shrinkage of moulding material after moulding, which makes it practically impossible to mould the bore to the close tolerances necessary to ensure a satisfactory interference fit. Thus for example in the case of a $\frac{5}{16}$ inch shaft it has been found that the minimum interference necessary to give a satisfactory grip is .002 inch, whereas the maximum interference must be less than .003 inch since at this figure the commutator is liable to crack. Due to unequal shrinkage after moulding, however, the bore is liable to vary in diameter by as much as .0015 inch while the tolerance of the ground shaft may be .0005 inch. Accordingly it will be seen that the necesary conditions cannot be fulfilled.

Experiments have been made with machining the bore to closer limits but apart from the fact that this involves an additional operation the moulding material normally has poor machining qualities and tool wear is high. Knurling of the shaft is a further alternative but this again represents an additional operation, and presents certain difficulties.

With the present arrangement the knurled bore is formed in the moulding operation and does not necessitate any additional operation. With a normal straight knurl having a 90° vertex angle it is found that a satisfactory grip is obtained with a minimum interference of .006 inch on the inner diameter while cracking does not occur till the interference reaches .012 to .013 inch. This allows a range of .006 inch within which the moulded bore variation of .0015 inch and the shaft tolerance of .0005 inch are easily contained. Indeed a factor of safety can be provided both at the higher end and at the lower end, while in addition the tolerance on the size of the shaft can be made easier.

The latitude of interference can be controlled to some extent by varying the depth of the knurl, for example by varying the angle of the peaks, increasing the depth having the effect of increasing the permissible interference and vice versa.

Figure 2:
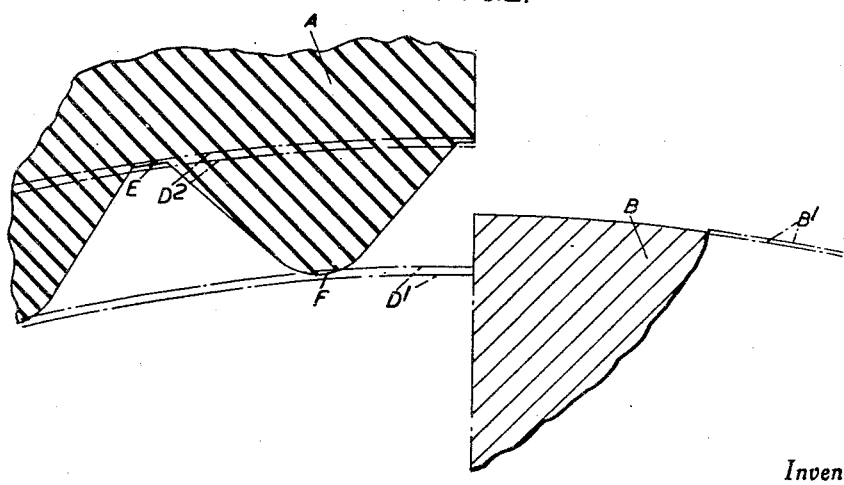

One specific embodiment of the invention may be referred to by way of example with reference to the accompanying drawings, in which:

Figure 1 is a perspective view of a moulded plastic commutator, and the plain shaft to be forced into it, and Figure 2 is a detail view showing the dimensions of the knurl in the bore in relation to the shaft, greatly enlarged.

In this example the invention is applied to a moulded type commutator A to be assembled to a plain $\frac{5}{16}$ inch diameter shaft B.

The shaft is machined to a total tolerance of .0005 inch and its limits of diameter are .3125 inch–.3130 inch as shown in dotted lines at $B^1$.

The commutator is moulded with a heat resistant phenolic moulding material to give a final inside bore diameter $D^1$ of .3030–.3045. These limits of bore size can, with suitable process control, be obtained on the article as moulded without further machining.

The moulded knurl on the commutator bore is .010 inch approximately in depth giving the bottoms of the troughs the limits indicated at $D^2$ and is of a normal V form, the angle in the V being approximately 90°. For convenience of manufacture the tops and bottoms of the knurl are not quite sharp but are slightly flat as shown at E where the width of each flat is .003 inch, or radiussed as shown at F where the radius is .005 inch. It was found satisfactory to mould 40 knurl teeth on the above commutator.

Thus, with dimensions indicated above, the interference arising between commutator and shaft, on assembly, is between .008 inch and .010 inch.

On assembly to a shaft the ridges of the moulded knurl crumble and fill the grooves without damaging the main body of the commutator, or other part, and a satisfactory rigid assembly is obtained over a wide range of interference.

What I claim as my invention and desire to secure by Letters Patent is:

1. The method of securing a molded commutator to the shaft of a dynamoelectric machine, which comprises molding the body of said commutator with a synthetic resin and also a ribbed hole, the smaller diameter of said hole defined by the peaks of said ribs being slightly less than the diameter of said shaft and the larger diameter of said hole defined by the bases of said ribs being slightly larger than said shaft, and thereafter forcing said shaft into said ribbed hole to crush the peaks of said synthetic ribs into the spaces therebetween to substantially conform said ribs to the diameter of said shaft without distorting the remaining resinous portion of said body.

2. A commutator, comprising a body of synthetic resinous material, segments in the exterior of said body, spaced resinous ribs defining a hole in said body, a supporting shaft in said hole, the peaks of said ribs displaced into the spaces between said ribs to conform said ribs to substantially the diameter of said shaft.

3. A commutator, comprising a body of synthetic resinous material, spaced resinous ribs defining a hole in said body to receive a larger diameter supporting shaft, said ribs having deformable resinous peaks displaceable into the spaces between said ribs by said shaft when the latter is inserted in said hole to thereby substantially conform said ribs to the diameter of said shaft.

4. A commutator, comprising a body of synthetic resinous material, commutator segments on the exterior surface of said body, spaced resinous ribs defining a hole in said body, a supporting member in said hole and of greater diameter than that defined by the peaks of said ribs, said peaks of said ribs removed and deposited between said ribs to conform the remainder of said ribs to substantially the diameter of said supporting member to secure the latter in said body.

5. A commutator, comprising a body, means defining a ribbed hole in said body, the peaks of said ribs being frangible, a supporting member in said hole and of greater diameter than that defined by the peaks of said ribs, said frangible peaks removed and deposited between said ribs to conform the remainder of said ribs to substantially the diameter of said supporting member to secure the latter in said body.

References Cited in the file of this patent

UNITED STATES PATENTS

| | | |
|---|---|---|
| 1,120,369 | Booraem | Dec. 8, 1914 |
| 1,157,666 | Bennett | Oct. 26, 1915 |
| 1,572,869 | Adams | Feb. 16, 1926 |
| 1,919,455 | Wilson | July 25, 1933 |
| 2,182,607 | Alden | Dec. 5, 1939 |
| 2,250,050 | Olson | July 22, 1941 |
| 2,471,625 | Johnstone | May 31, 1949 |
| 2,541,047 | Frisbie | Feb. 13, 1951 |
| 2,574,134 | Vigren et al. | Nov. 6, 1951 |
| 2,575,481 | Anderson | Nov. 20, 1951 |

FOREIGN PATENTS

| | | |
|---|---|---|
| 477,251 | Great Britain | Dec. 24, 1937 |